(12) United States Patent
Rönkkö

(10) Patent No.: US 7,099,708 B2
(45) Date of Patent: Aug. 29, 2006

(54) FOLDABLE/SLIDABLE FUNCTION KEYBOARD FOR AN ELECTRONIC DEVICE

(75) Inventor: Antti Rönkkö, Espoo (FI)

(73) Assignee: Nokia Corporation, Espoo (FI)

( * ) Notice: Subject to any disclaimer, the term of this patent is extended or adjusted under 35 U.S.C. 154(b) by 268 days.

(21) Appl. No.: 10/757,983

(22) Filed: Jan. 14, 2004

(65) Prior Publication Data

US 2005/0153728 A1      Jul. 14, 2005

(51) Int. Cl.
*H04M 1/00*      (2006.01)
(52) U.S. Cl. .............................. 455/575.1; 455/550.1; 455/556.1; 455/556.2; 455/575.3; 455/575.4
(58) Field of Classification Search ............. 455/550.1, 455/556.1, 556.2, 566, 575.3, 575.4; 379/433.12, 379/433.13
See application file for complete search history.

(56) References Cited

U.S. PATENT DOCUMENTS

| 6,580,932 | B1 | 6/2003 | Finke-Anlauff | ............. 455/575 |
| 2003/0073414 | A1* | 4/2003 | Capps | ......................... 455/90 |
| 2003/0157957 | A1* | 8/2003 | Wendorff et al. | ........... 455/550 |

* cited by examiner

*Primary Examiner*—Nick Corsaro
*Assistant Examiner*—Sayed T. Zewari
(74) *Attorney, Agent, or Firm*—Ware, Fressola, Van Der Sluys & Adolphson LLP (57) ABSTRACT

A mobile communication device has a full function keyboard constructed in two positions wherein the first portion may be pivoted and the second portion may be moved linearly sideways between respective open and closed positions one in which the keyboard is hidden and the keypad of the device is exposed for normal use and a second in which a larger viewing area of the display screen is revealed and the two portions of the keyboard are positioned on opposite sides of the screen of the device.

40 Claims, 5 Drawing Sheets

FOLDABLE/SLIDABLE FUNCTION KEYBOARD FOR AN ELECTRONIC DEVICE

BACKGROUND OF THE INVENTION

The present invention relates generally to electronic devices and deals more particularly with mobile communication devices specifically mobile telephones and similar communication devices of the type having keyboard functionality.

Portable electronic devices particularly mobile telephones and similar communication devices have rapidly expanded in use and function as users have demanded increasing functionality. It is common to see mobile telephones that provide Global Computer Network access, messaging, personal information management, personal digital assistant functionality, music, facsimile, gaming, in addition to telephone communication. More complex keyboards have been provided to be compatible with the more complex applications that are found in such devices. One such full function keyboard arrangement is disclosed in U.S. Pat. No. 6,580,932, assigned to the same assignee as the present invention in which a foldable keyboard is provided wherein a panel has an inner and outer surface and rotates between two positions. The outer surface carries a communication keyboard and the inner surfaces carries a portion of the number of keys of the full function keyboard which keys are exposed for access and usage when the panel is rotated into an open position. The panel is in an overlapping position with a further fixed panel that carries the remaining portion of the number of keys of the keyboard on the fixed panel are exposed for access and usage when the rotated panel is in the open position. Although such devices are capable of providing more complex applications the display screen size remains fixed for both standard communication functionality and the advanced more complex functionalities.

It would be desirable to provide a larger display screen size and a full function keyboard for such communication devices while maintaining the compact size required in the mobile communication device.

It is an object of the present invention to provide a simple and inexpensive means of providing a full function keyboard and a larger display screen size to accommodate the more complex applications of a mobile communication device when operated in the non-communication functionality mode.

SUMMARY OF THE INVENTION

In accordance with a first aspect of the invention, an electronic device for operation in multiple applications reveals a larger screen display viewing area in the device open position and includes a main body element having upper and lower faces relative to usage wherein the screen is constructed in at least a first portion of the upper face of said main body element to provide a visible display of information to the user. A first panel having first and second faces is mounted on the main body element for pivotal motion thereon between the device open and closed positions. The first face is accessible to the user in the closed position and the second face is accessible to the user in said open position. A second panel having a third face is mounted on the main body element for sideways rectilinear motion thereon and relative thereto between the device open and closed positions. The third face is accessible to the user in the open position and inaccessible to the user in the closed position and the first and second panels are in overlapping alignment with one another in the device closed position.

A function keyboard is constructed in two portions wherein a first is portion constructed in the second face of the first panel and a second portion is constructed in the third face of the second panel and each of the function keyboard portions has an array of keys consistent with a selected function, the function keyboard is exposed for operative use in the device open position wherein the first and second panels are in non-overlapping alignment with one another in the open position and the first and second panels are located on opposite sides of the screen in the open position wherein an additional portion of the upper face of the main body element located beneath and substantially covered by the second panel in the closed position is revealed and accessible to the user in the open position. The device moves between open and closed positions wherein the first panel is manually rotated about its pivotal axis and the second panel is manually moved sideways. Optionally, the device may operate semi-automatically wherein the first panel is manually rotated about is pivotal axis and the second panel is spring assisted to move between the closed position and open position. Optionally, the device may operate semi-automatically wheren the first panel is spring assisted to move between the closed position and the open position and the second panel is manually moved sideways. Optionally, both the first panel and second panel may be spring assisted to move between the closed position and the open position. The first and second panels may further be mechanically linked such that rotational movement of the first panel about its pivotal axis causes sideways linear movement of the second panel. The second panel may be optionally inhibited for sideways movement whereby only the first panel rotates about its pivotal axis between the open and closed positions and the second panel remains stationary. Optionally, the additional portion of the upper face of the main body element carries an additional array of keys consistent with a selected function. Preferably, the screen is constructed in at least the first portion and the additional portion of the upper face and defines a full screen wherein the first and second panels are in overlapping alignment with one another and the portion of the screen located in the additional portion of the upper face whereby the visible area for display of information is restricted to less than the full screen in the device closed position and wherein the full screen area is available for visible display of information to the user in the open position. Optionally, the function keyboard comprises a full function QWERTY key array split in the first and second portions constructed respectively in the first and second panels. Alternately, the function keyboard comprises a game controller with multiple function keys divided between the first and second panels or may be of any desired keyboard array. Preferably, the array of keys on the faces of the panels are offset to prevent interference between the keys of the faces in the device closed position. Optionally, the device is a mobile communication device and further comprises a communication keypad constructed on the first face of the first panel wherein the communication is exposed for operative use in the device closed position.

Optionally, a control unit is provided and operates to rotate the orientation of the display on the screen consistent with the functional position of the first and second panels so that the display is aligned with the communication keypad in the device closed position and aligned with the functional keyboard in the device open position. Preferably, the display on the screen is rotated 90° between the open and closed positions, wherein the orientation is controlled by the position of the first panel or the position of the second panel. Preferably, the communication device keypad is locked in an inoperative mode in the device open position.

In accordance with a second aspect of the invention, a function keyboard for use in a mobile communications device having a main body element, a communications keypad, and a screen for displaying information to the user is provided. A first panel having first and second faces is mounted on the main body element and has upper and lower surfaces for pivotal motion thereon between open and closed positions. The communications keypad is constructed on the first panel and is exposed for operative use in the device closed position. A second panel having a third face is mounted on the main body element for sideways rectilinear motion thereon and relative thereto between the device open and closed positions. The third face is accessible to the user in the device open position and inaccessible to the user in the device closed position;

The function keyboard is constructed in two portions wherein a first portion is constructed in the second face of the first panel and a second portion is constructed in the third face of the second panel. Each of the function keyboard portions has an array of keys consistent with a selected function wherein the function keyboard is exposed for operative use in the device open position and the first and second panels are in overlapping alignment with one another in the device closed position.

The first and second panels are in non-overlapping alignment with one another in the device open position and are located on opposite sides of the screen wherein an additional portion of the upper face of the main body element located beneath and substantially covered by the second panel in the device closed position is revealed and accessible to the user in the device open position.

In accordance with a third aspect of the invention, a mobile communications device for operation in multiple applications is presented and comprises a main body element having upper and lower faces relative to usage and a screen constructed in at least a first portion of the upper face of the main body element to provide a visible display of information to the user. A first panel having first and second faces is mounted on the main body element for pivotal motion thereon between the device open and closed positions. The first face is accessible to the user in the device closed position and the second face is accessible to the user in the device open position. A second panel having a third face is mounted on the main body element for sideways rectilinear motion thereon and relative thereto between the device open and closed positions. The, third face is accessible to the user in the device open position and inaccessible to the user in the device closed position wherein the first and second panels are in overlapping alignment with one another in the closed position. A communication keypad is constructed on the first face of the first panel and is exposed for operative use in the device closed position.

A function keyboard is constructed in two portions, the first portion constructed in the second face of the first panel and a second portion constructed in the third face of the second panel, each of the function keyboard portions has an array of keys consistent with a selected function. The function keyboard is exposed for operative use in the device open position. The first and second panels are in non-overlapping alignment with one another in the device open position and are located on opposite sides of the screen wherein an additional portion of the upper face of the main body element located beneath and substantially covered by the second panel in the device closed position is revealed and accessible to the user in the device open position.

In accordance with a fourth aspect of the invention, a function keyboard for use in an electronic device having a main body element, and a screen for displaying information to the user is presented wherein the keyboard includes a first panel having first and second faces mounted on the main body element having upper and lower surfaces for pivotal motion thereon between open and closed positions and a second panel having a third face mounted on the main body element for sideways rectilinear motion thereon and relative thereto between the device open and closed positions wherein the third face is accessible to the user in the device open position and inaccessible to the user in the device closed position.

The function keyboard is constructed in two portions wherein a first portion is constructed in the second face of the first panel and a second portion is constructed in the third face of the second panel. Each of the function keyboard portions has an array of keys consistent with a selected function wherein said function keyboard is exposed for operative use in the device open position. The first and second panels are in overlapping alignment with one another in the device closed position and in non-overlapping alignment with one another in the device open position and the first and second panels are located on opposite sides of the screen in the device open position wherein an additional portion of the upper face of the main body element located beneath and substantially covered by the second panel in the device closed position is revealed and accessible to the user in the device open position.

Preferably, the screen is constructed in the first portion and the additional portion of the upper face and defines a full screen wherein the first and second panels are in overlapping alignment with one another and the portion of the screen located in the additional portion of the upper face whereby the visible area for display of information is restricted to less than the full screen in the device closed position and wherein the full screen area is available for visible display of information to the user in the device open position.

In accordance with a fifth aspect of the invention, an electronic device for operation in multiple applications is presented and includes a main body element having upper and lower faces relative to usage and a screen constructed in at least a first portion of the upper face of the main body element to provide a visible display of information to the user. A first panel having first and second face is mounted on the main body element for pivotal motion thereon between the device open and closed positions. The first face is accessible to the user in the device closed position and the second face is accessible to the user in the device open position. A second panel having a third face is mounted on the main body element for sideways rectilinear motion thereon and relative thereto between the device open and closed positions. The third face is accessible to the user in the device open position and inaccessible to the user in the device closed position and the first and second panels are in overlapping alignment with one another in the closed position. A function keyboard is constructed in two portions wherein a first portion is constructed in the second face of the first panel and a second portion constructed in the third face of the second panel. Each of the function keyboard portions has an array of keys consistent with a selected function. The function keyboard is exposed for operative use in the device open position wherein the function keyboard comprises a game controller with multiple function keys divided between the first and second panels.

In accordance with a sixth aspect of the invention, an electronic device for operation in multiple applications includes a main body element having upper and lower faces relative to usage and a screen constructed in at least a first portion of the upper face of the main body element to provide a visible display of information to the user. A first panel having first and second faces is mounted on the main body element for pivotal motion thereon between the device open and closed positions. The first face is accessible to the user in the closed position and the second face is accessible to the user in the open position. A second panel having a third face is mounted on the main body element for sideways rectilinear motion thereon and relative thereto between open and closed positions. The third face is accessible to the user in the open position and inaccessible to the user in the closed position and the first and second panels are in overlapping alignment with one another in the closed position. A function keyboard is constructed in two portions wherein a first portion is constructed in the second face of the first panel and a second portion is constructed in the third face of the second panel. Each of the function keyboard portions has an array of keys consistent with a selected function, and is exposed for operative use in the device open position wherein the array of keys on the faces of the panels are offset to prevent interference between the keys of the faces in the device closed position.

In accordance with a further aspect of the invention, an electronic device for operation in multiple applications is presented and includes a main body element having upper and lower faces relative to usage and a screen constructed in at least a first portion of the upper face of the main body element to provide a visible display of information to the user. A first panel having first and second faces is mounted on the main body element for pivotal motion thereon between open and closed positions. The first face is accessible to the user in the device closed position and the second face is accessible to the user in the device open position. A second panel having a third face is mounted on the main body element for sideways rectilinear motion thereon and relative thereto between the device open and closed positions. The third face is accessible to the user in the open position and inaccessible to the user in the closed position wherein the first and second panels are in overlapping alignment with one another in the closed position. A function keyboard is constructed in two portions wherein a first portion is constructed in the second face of the first panel and a second portion is constructed in the third face of the second panel. Each of the function keyboard portions has an array of keys consistent with a selected function wherein the function keyboard is exposed for operative use in the device open position and wherein the device is a mobile communication device and further comprises a communication keypad constructed on the first face of the first panel and is exposed for operative use in the closed position. The mobile communications device further includes a control unit that operates to rotate the orientation of the display on the screen consistent with the functional position of the first and second panels so that the display is aligned with the communication keypad in the device closed position and aligned with the functional keyboard in the device open position.

In a yet further aspect of the invention, a function keyboard for use in an electronic device having a main body element, and a screen for displaying information to the user is presented wherein the keyboard includes a first panel having first and second faces mounted on the main body element having upper and lower surfaces for pivotal motion thereon between open and closed positions. A second panel having a third face is mounted on the main body element for sideways rectilinear motion thereon and relative thereto between open and closed positions. The third face is accessible to the user in the open position and inaccessible to the user in the closed position. The function keyboard is constructed in two portions wherein a first portion is constructed in the second face of the first panel and a second portion is constructed in the third face of the second panel. Each of the function keyboard portions has an array of keys consistent with a selected function and is exposed for operative use in the open position, and wherein the portions of the function keyboard include a game controller with multiple function keys divided between the first and second panels.

DESCRIPTION OF THE DRAWINGS

Other features, objects and advantages of the present invention will become readily apparent from the following written description of exemplary embodiments taken in connection with the figures wherein.

DESCRIPTION OF PREFERRED EMBODIMENTS

Figures 1, 2:
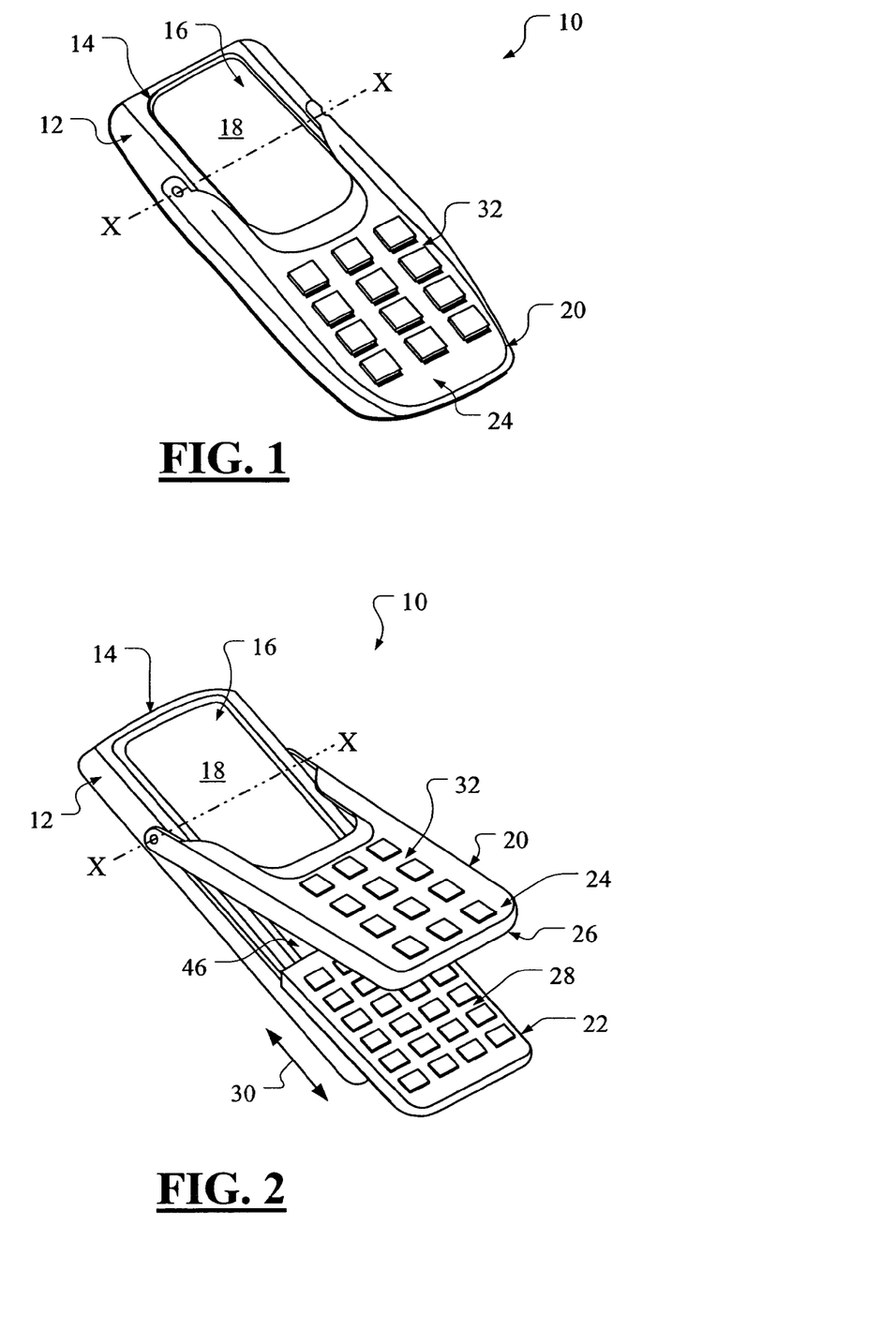
FIG. 1 is a somewhat schematic perspective view of a mobile communication device embodying the present invention.
FIG. 2 is a somewhat schematic view of the mobile communication device of FIG. 1 showing the first panel in an intermediate rotated position and the second panel moved linearly away from the main body as it might be between open and closed positions.
Figure 3:
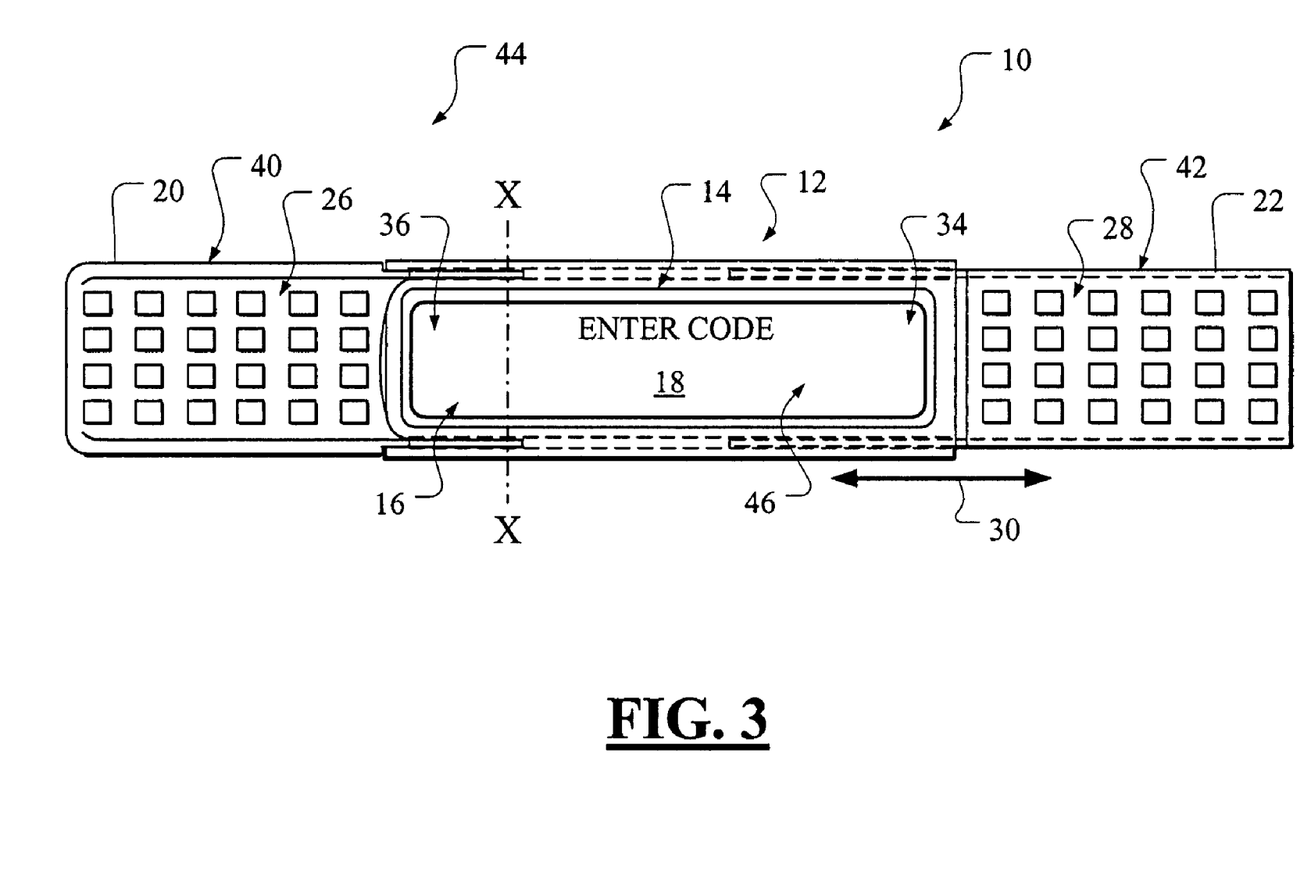
FIG. 3 is a somewhat schematic top view of the mobile communication device of FIG. 1 in the fully open position revealing the full display screen of the device.

Turning now to the drawings an illustrative embodiment of the present invention is shown in FIGS. 1–3 for purposes of illustration as a mobile communication device and is generally designated 10. Although the invention is described as a mobile communication device such as a mobile telephone, the invention is applicable to other electronic devices such as pagers, game units, music players and the like. As illustrated in FIG. 1, the mobile phone 10 is shown in a first position referred to as the fully closed position and is constructed having a main body element 12. The main body element 12 includes encloses a screen 14 a portion of which generally designated 16 is viewable in the closed position and provides a display 18 for communicating pertinent information to the user in response to actions by the user. As best viewed in FIGS. 2 and 3, the mobile telephone is constructed having two panels 20 and 22 which are mounted on the main body element 12.

The first panel 20 is mounted on the main body element 12 and is rotatable about an axis X—X as shown in FIGS. 1, 2 and 3. The second panel 22 is mounted on the main body element 12 and arranged for slidable engagement with the body element relative to the body element between the closed position and the open position in the direction indicated by the direction arrow 30 as shown in FIGS. 2 and 3. In the closed position, the panel 20 is rotated into overlapping alignment with the panel 22 as shown in FIG. 1. The rotating panel 20 has two oppositely disposed faces 24 and 26. Face 26 is the inner face when the panel 20 is in the closed position and face 24 is the outer face in the closed position. In the illustrated embodiment, face 24 contains a communications keypad such as a standard telephone keypad generally designated 32 for use when the mobile phone 10 is operating in the standard communication mode. In the closed position, the mobile phone 10 operates as a standard operating mobile telephone with the display 18 of screen 14 oriented in alignment with the keypad 32 in a well known conventional manner. The second panel 22 has a face 28 which is exposed as the outer face when the panel 22 moves to its operative position as illustrated in FIG. 3 when the mobile phone 10 is in the open position. The panel 22 moves along a rectilinear path to one side 34 of the screen 14 as the panel 20 is rotated to the mobile phone open position as illustrated in FIG. 3 at the end 36 of the screen 14 opposite the screen end 34. In one embodiment, the first panel 20 is manually rotated about its axis X—X to its open position and the second panel 22 is manually moved sideways along the rectilinear path in the direction indicated by the direction arrow 30. In this embodiment, the first panel 20 is moved to its open position prior to the second panel 22 being moved to its open position, and the second panel 22 is moved to its closed position prior to the first panel being rotated to its closed position.

Figure 7:
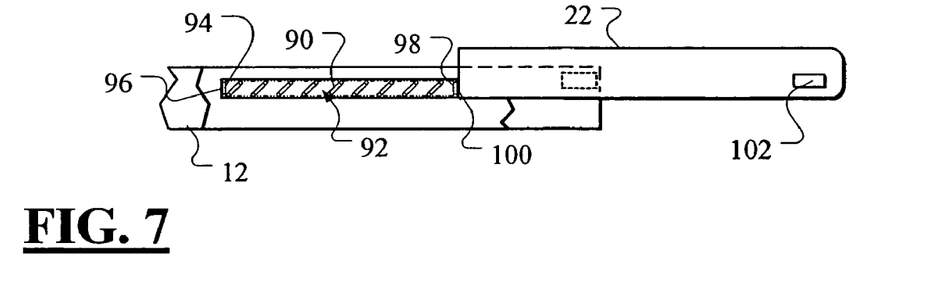
FIG. 7 is a schematic illustration of the mobile communication device of FIG. 1 with a bias assisted second panel for semi-automatic operation between the closed and open position.

In an alternate embodiment, the device 10 may operate semi-automatically wherein the first panel 20 is manually rotated about its pivot axis X—X to the open position and the second panel 22 is biased or spring assisted to move between the closed position and its open position utilizing any suitable biasing means well known to those skilled in the art to carry out the intended function. For example, as illustrated schematically in FIG. 7, a coil spring 90 is in an uncompressed state and shown in a slot 92 and has one end 94 in contact with a stop 96 and its opposite end 98 in contact with the end 100 of the second panel 22. The spring 90 is in a compressed state when the second panel 22 is in the closed position and may be held in the closed position by any suitable means such as a releaseable button 102 that cooperates with the main body element 12 to hold the second panel 222 in its closed position and the spring 90 in its compressed state. When the releaseable button 102 is operated, the force of the compressed spring urges the second panel 22 toward its open position.

Figure 8:
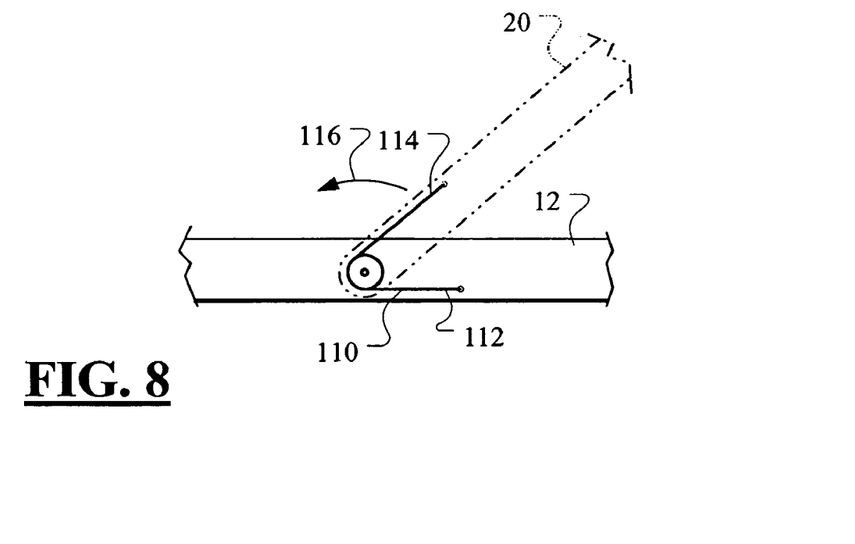
FIG. 8 is a schematic illustration of the mobile communication device of FIG. 1 with a bias assisted first panel for semi-automatic operation between the closed and open position.

In a further embodiment, the device 10 may operate semi-automatically wherein the first panel 20 is biased or spring assisted to move between its closed position to its open position utilizing any suitable biasing means well known to those skilled in the art to carry out the intended function. For example, as illustrated schematically in FIG. 8, a hairpin spring 110 is located with its opening about the pivot point of the first panel 20 and has one end 112 engaged with the body 12 and its other end 114 engaged with the arm of the first panel 20. The hairpin spring 110 compresses when the first panel 20 is moved to its closed position. When the first panel 20 is released, the end 114 of the hairpin spring 110 urges the panel in the direction of arrow 116 to rotate about its pivot axis to its open position.

In another embodiment, the device 10 may operate semi-automatically wherein both the first panel 20 and the second panel 22 are biased or spring assisted to move between respective closed and open positions.

Figure 9:
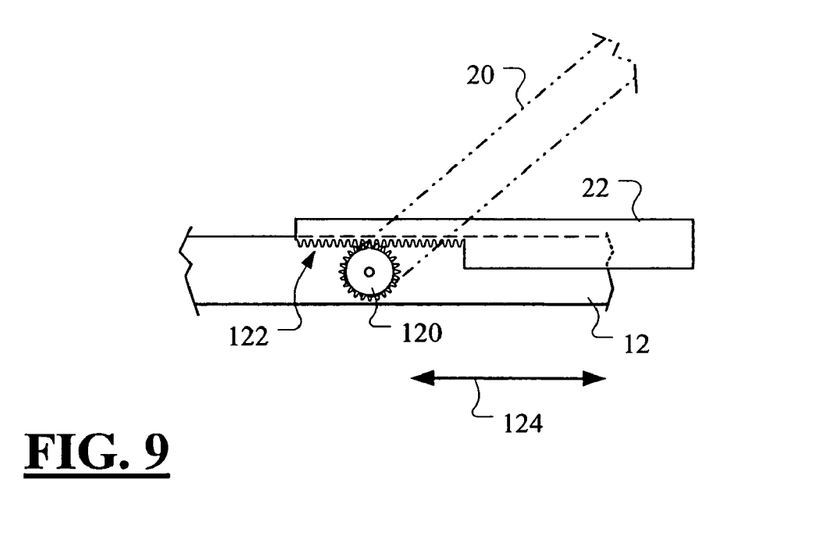
FIG. 9 is a schematic illustration of the mobile communication device of FIG. 1 wherein the first panel and second panel are mechanically linked for movement with one another between the closed and open positions.

In a still further embodiment, the panels 20 and 22 may be mechanically linked and arranged for cooperative movement with one another such that as the first panel 20 is rotated from the mobile phone closed position to the open position, the second panel 22 moves along the rectilinear path from the mobile phone closed position to the open position as illustrated in FIG. 3 and visa versa when the mobile phone moves from its open position to its closed position. A mechanically linked arrangement is shown schematically for example in FIG. 9 wherein a wheel gear 120 is attached to the arm of the first panel 20 at its pivot point. The second panel 22 includes a rack gear 122 at one end and the teeth of the rack gear cooperate with the teeth of the wheel gear such that rotation of the first panel 20 about is pivot axis causes sideways linear movement of the second panel 22 in the direction indicated by arrow 124. Thus, the second panel 22 is moved to its open position when the first panel 20 is rotated to its open position and the second panel 22 is moved to its closed position when the first panel 20 is rotated to its closed position.

As best illustrated in FIG. 3, the full function keyboard is divided in half and arranged on the left and right keyboard portions 40 and 42. The left and right keyboard portions 40 and 42 carry the key and button array 44 used for the particular application wherein the key and button array is divided in half and arranged on the left and right keyboard portions 40 and 42, respectively. The keyboard is designed for thumb actuation by both hands which makes it convenient to hold the mobile phone 10 in both hands and operate the keyboard portions 40 and 42 accurately and efficiently.

As best illustrated in FIG. 3, the left-hand keyboard portion 40 is constructed on the face 26 of the rotating panel 20 on the opposite side of the communication keypad 32. The right-hand keyboard portion 42 is constructed on the upper face 28 of the panel 22. To insure a compact overlapping engagement of the panels 20 and 22 in the mobile phone closed position, the portions of the key array 44 on the opposing panel faces 26 and 28 are offset to avoid interference in the closed position. Alternately, the height or depth of the keys are such that there is sufficient clearance when the panels 20 and 22 are in the closed position. In the mobile phone open position, an additional area or portion 46 of the screen 14 carried in the upper face of the main body element which in the closed position is located beneath and substantially covered by the panel 22 in the closed position is revealed to provide a substantially larger viewing area of the display 18. The portions 16 and 46 define a full screen area for visible display of information to the user when the phone is in the open position. The benefits of a larger screen display viewing area are apparent since additional information may be provided to the user without scrolling or jumping from screen to screen. A larger screen viewing area such as provided by the present invention is also beneficial to game playing or viewing website information such as downloadable from the global computer network in a manner well known to those skilled in the art.

Figure 4A:
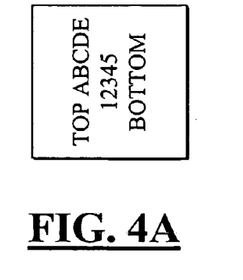
FIG. 4a is a schematic illustration if the display orientation in the device closed position.
Figure 4B:
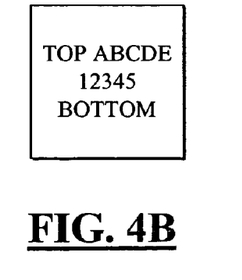
FIG. 4b is a schematic illustration of the display orientation in the device closed position.
Figure 5:
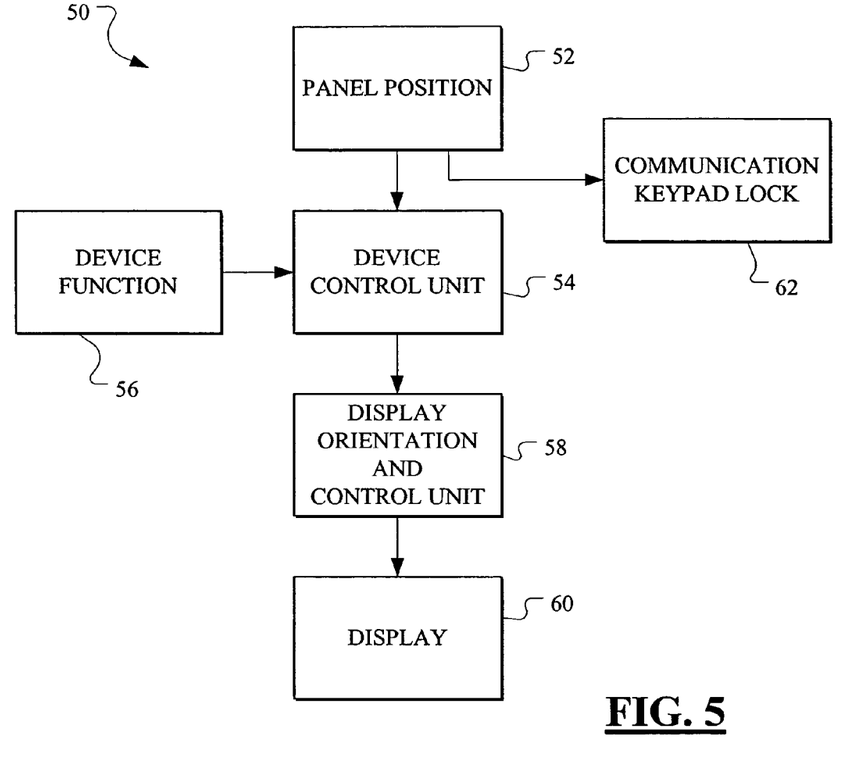
FIG. 5 is a block diagram of the control system of a mobile communication device embodying the present invention.

The display 18 of the screen 14 is controlled for orientation in the two positions depending upon the mode of use. For example, in the mobile phone closed position, the display 18 is oriented in alignment with the communication keypad 32 while in the mobile phone open position, the display 18 is aligned with the function key array 44. As illustrated in FIGS. 4a and 4b, the display orientation is rotated ninety degrees between the mobile phone communication mode in which the panels 20 and 22 are in the closed position to the full function mode wherein the panels 20 and 22 are in the mobile phone open position. The orientation of a display and other operative functions of the mobile phone 10 are carried out by means of a system control unit such as illustrated in the schematic functional block diagram in FIG. 5. A panel position indicator 52 provides a signal to the device control unit 54 in response to the panel 20 and/or panel 22 being in the mobile phone opened or closed position. The device control unit 54 may be a microprocessor, digital signal processor, a display driver or other means including both the hardware and software for carrying out the control function as well known by those skilled in the art. The device control unit 54 may likewise be manually operated by the user and which provides a device function input 56 by means of a key or other operative stimulus. The device function signal is coupled to the device control unit 54. The device control unit 54 provides an output signal corresponding to the desired orientation of the display to a display orientation and control unit 58 to orient the position of the display 60 as needed. The panel position sensor and indicator 52 may likewise provide an output signal to enable or disable the keys of the communication keypad 32 by operation of a communication keypad lock 62.

Figure 6:
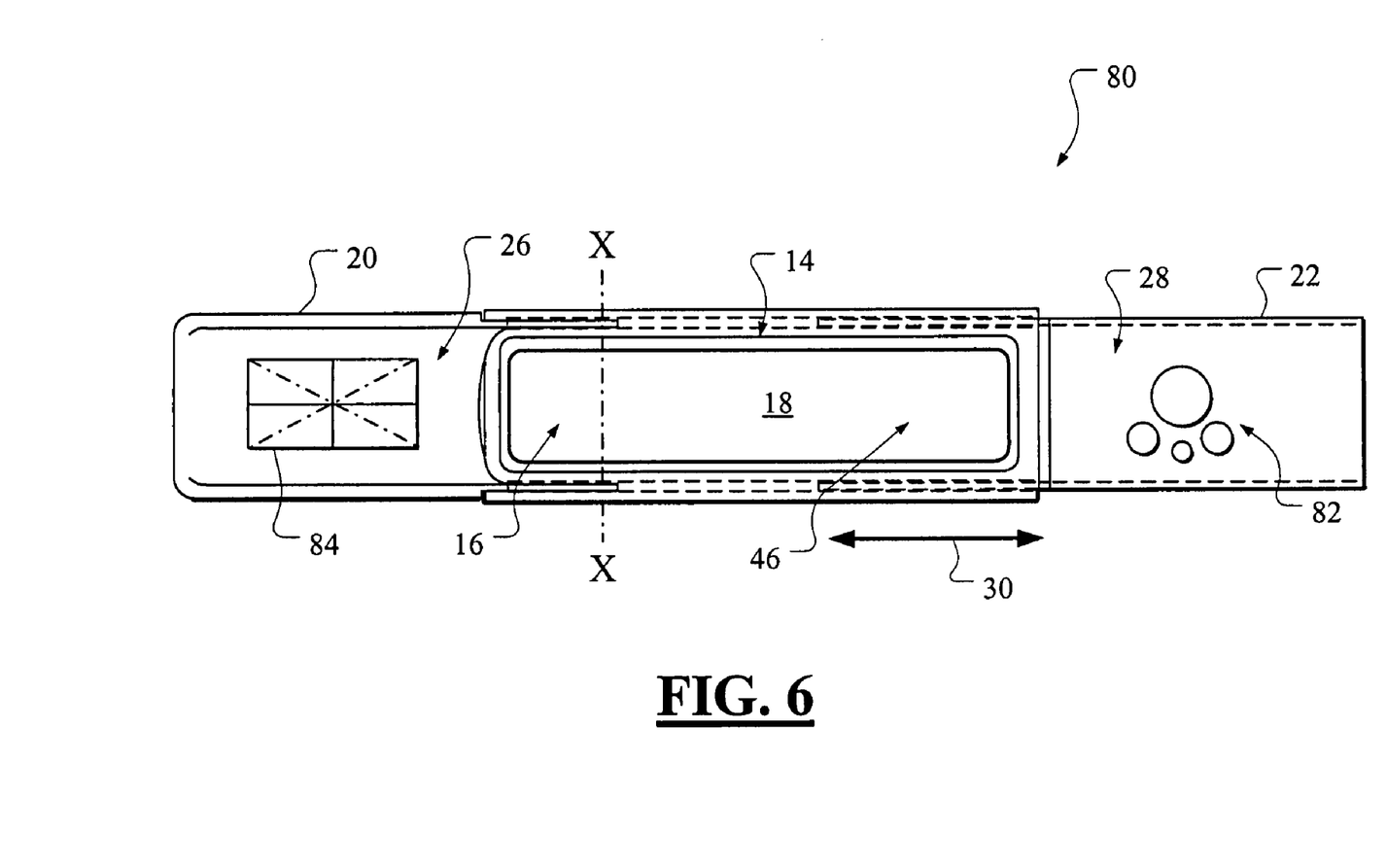
FIG. 6 is a somewhat schematic top view of an alternate embodiment of the present invention.

Turning to FIG. 6, a somewhat schematic top view of an alternate embodiment of the present invention is illustrated therein and generally designated 80 wherein a game controller keypad is provided rather than a full function keyboard. The game keyboard comprises a set of action keys generally designated 82 constructed on the face 28 of the panel 22. A motion pad or joystick generally designated 84 is constructed on the face 26 of the panel 20. In the closed position, the panel 22 moves along a rectilinear path in the direction of the direction arrow 30 covering the portion of the screen 14 as the panel 20 rotates about the axis X—X into an overlapping alignment with the panel 22 in the mobile phone closed position. The communication keypad 32 is constructed on the side opposite the face 26 of the panel 20 as discussed and described above.

In a further embodiment, the device could be utilized without a communication keypad or communication capability and used as a game unit only.

An electronic device for operation in multiple applications particularly useful as a mobile communication device has been disclosed above wherein the screen display size is increased in area from a portion of a display in the mobile phone closed position to a full screen display in the mobile phone opened position in which a rotating panel is at one side of the screen and a sliding panel is at the opposite side of the screen in the open position. The panels in the opened position can carry other desired key arrays consistent with a selected function such as other functional keyboards, game units or other operative devices. The screen display may be of any standard type including color well known to those skilled in the art. Accordingly, numerous changes, additions or modifications may be made by those skilled in the art without departing from the spirit and scope of the invention and, therefore, the invention has been presented by way of illustration rather than limitation.

The invention claimed:

1. An electronic device for operation in multiple applications comprising:
    a main body element having upper and lower faces relative to usage;
    a screen constructed in at least a first portion of the upper face of said main body element to provide a visible display of information to the user;
    a first panel mounted on the main body element for pivotal motion thereon between open and closed positions, said first panel having first and second faces, said first face accessible to the user in said closed position and said second face accessible to the user in said open position;
    a second panel mounted on the main body element for sideways rectilinear motion thereon and relative thereto between open and closed positions, said second panel having a third face, said third face accessible to the user in said open position and inaccessible to the user in said closed position;
    said first and second panels are in overlapping alignment with one another in the closed position;
    a function keyboard constructed in two portions, a first portion constructed in the second face of said first panel and a second portion constructed in said third face of said second panel, each of said function keyboard portions having an array of keys consistent with a selected function;
    said function keyboard is exposed for operative use in said open position wherein said first and second panels are in non-overlapping alignment with one another and are located on opposite sides of said screen wherein an additional portion of the upper face of said main body element located beneath and substantially covered by said second panel in said closed position is revealed and accessible to the user in said open position, and
    said screen further being constructed in said additional portion and said at least first portion of said upper face and defining a full screen, whereby in said closed position the visible area for display of information is restricted to less than the full screen area and in the open position said full screen area is available for visible display of information to the user.

2. The electronic device for operation in multiple applications as defined in claim 1, wherein said first panel is manually rotatable about its pivotal axis.

3. The electronic device for operation in multiple applications as defined in claim 1, wherein said second panel is manually moved sideways.

4. The electronic device for operation in multiple applications as defined in claim 1 arranged for semi-automatic operation wherein said first panel is bias assisted between its respective said closed and open position.

5. The electronic device for operation in multiple applications as defined in claim 1 arranged for semi-automatic operation wherein said second panel is bias assisted between its respective said closed and open position.

6. The electronic device for operation in multiple applications as defined in claim 1 arranged for semi-automatic operation wherein said first and second panels are mechanically linked such that rotational movement of said first panel about its pivotal axis causes sideways linear movement of said second panel.

7. The electronic device for operation in multiple applications as defined in claim 1, wherein said second panel is inhibited for sideways movement and said first panel rotates about its pivotal axis between said open and closed positions.

8. An electronic device for operation in multiple applications comprising:
- a main body element having upper and lower faces relative to usage;
- a screen constructed in at least a first portion of the upper face of said main body element to provide a visible display of information to the user;
- a first panel mounted on the main body element for pivotal motion thereon between open and closed positions, said first panel having first and second faces, said first face accessible to the user in said closed position and said second face accessible to the user in said open position;
- a second panel mounted on the main body element for sideways rectilinear motion thereon and relative thereto between open and closed positions, said second panel having a third face, said third face accessible to the user in said open position and inaccessible to the user in said closed position;
- said first and second panels are in overlapping alignment with one another in the closed position wherein said first and second panels are mechanically linked such that rotational movement of said first panel about its pivotal axis causes sideways linear movement of said second panel;
- a function keyboard constructed in two portions, a first portion constructed in the second face of said first panel and a second portion constructed in said third face of said second panel, each of said function keyboard portions having an array of keys consistent with a selected function;
- said function keyboard is exposed for operative use in said open position wherein said first and second panels are in non-overlapping alignment with one another and are located on opposite sides of said screen wherein an additional portion of the upper face of said main body element located beneath and substantially covered by said second panel in said closed position is revealed and accessible to the user in said open position.

9. The electronic device for operation in multiple applications as defined in claim 8, wherein said additional portion of the upper face of said main body element carries an additional array of keys consistent with a selected function.

10. The electronic device for operation in multiple applications as defined in claim 8, wherein said function keyboard comprises a full function QWERTY key array split in first and second portions constructed respectively in said first and second panels.

11. The electronic device for operation in multiple applications as defined in claim 8, wherein said function keyboard comprises a game controller with multiple function keys divided between said first and second panels.

12. The electronic device for operation in multiple applications as defined in claim 8, wherein said array of keys on said faces of said panels are offset to prevent interference between the keys of said faces in said closed position.

13. The electronic device for operation in multiple applications as defined in claim 8, wherein said device is a mobile communication device and further comprises a communication keypad constructed on said first face of said first panel, said keypad being exposed for operative use in said closed position.

14. The electronic device for operation in multiple applications as defined in claim 13, further including a control unit, said control unit further operating to rotate the orientation of the display on said screen consistent with the functional position of said first and second panels so that said display is aligned with said communication keypad in said closed position and aligned with said functional keyboard in said open position.

15. The electronic device for operation in multiple applications as defined in claim 14, wherein said display on said screen is rotated 90° between said open and closed positions.

16. The electronic device for operation in multiple applications as defined in claim 15, wherein said orientation is controlled by the position of said first panel.

17. The electronic device for operation in multiple applications as defined in claim 15, wherein said orientation is controlled by the position of said second panel.

18. The electronic device for operation in multiple applications as defined in claim 13, wherein said communication device keypad is locked in an inoperative mode in said open position.

19. A function keyboard for use in an electronic device, said device having a main body element, and a screen for displaying information to the user, said keyboard comprising:
- a first panel mounted on the main body element having upper and lower surfaces for pivotal motion thereon between open and closed positions, said first panel having first and second faces;
- a second panel mounted on the main body element for sideways rectilinear motion thereon and relative thereto between open and closed positions, said second panel having a third face, said third face accessible to the user in said open position and inaccessible to the user in said closed position;
- wherein said function keyboard is constructed in two portions, a first portion constructed in the second face of said first panel and a second portion constructed in said third face of said second panel, each of said function keyboard portions having an array of keys consistent with a selected function, wherein said function keyboard is exposed for operative use in said open position;
- wherein said first and second panels are in overlapping alignment with one another in the closed position, and wherein said first and second panels are in non-overlapping alignment with one another and are located on opposite sides of said screen in said open position wherein an additional portion of the upper face of said main body element located beneath and substantially covered by said second panel in said closed position is revealed and accessible to the user in said open position; and
- wherein sideways linear movement of said second panel causes rotational movement of said first panel about its pivot axis.

20. A function keyboard for use in an electronic device, said device having a main body element, and a screen for displaying information to the user, said keyboard as defined in claim 19, wherein said additional portion of the upper face of said main body element carries an additional array of keys consistent with a selected function.

21. A function keyboard for use in an electronic device, said device having a main body element, and a screen for displaying information to the user, said keyboard as defined in claim 19, wherein said screen is constructed in said at least first portion and said additional portion of said upper face and defining a full screen wherein said first and second panels are in overlapping alignment with one another and the portion of said screen located in said additional portion of said upper face whereby the visible area for display of information is restricted to less than the full screen and wherein said full screen area is available for visible display of information to the user in said open position.

22. A function keyboard for use in an electronic device, said device having a main body element, and a screen for displaying information to the user, said keyboard as defined in claim 19, wherein said function keyboard comprises a full function QWERTY key array split in first and second portions constructed respectively in said first and second panels.

23. A function keyboard for use in an electronic device, said device having a main body element, and a screen for displaying information to the user, said keyboard as defined in claim 19, wherein said function keyboard comprises a game controller with multiple function keys divided between said first and second panels.

24. A function keyboard for use in an electronic device, said device having a main body element, and a screen for displaying information to the user, said keyboard as defined in claim 19, wherein said array of keys on said faces of said panels are offset to prevent interference between the keys of said faces in said closed position.

25. A function keyboard for use in an electronic device, said device having a main body element, and a screen for displaying information to the user, said keyboard comprising:
  a first panel mounted on the main body element having upper and lower surfaces for pivotal motion thereon between open and closed positions, said first panel having first and second faces;
  a second panel mounted on the main body element for sideways rectilinear motion thereon and relative thereto between open and closed positions, said second panel having a third face, said third face accessible to the user in said open position and inaccessible to the user in said closed position;
  wherein said function keyboard is constructed in two portions, a first portion constructed in the second face of said first panel and a second portion constructed in said third face of said second panel, each of said function keyboard portions having an array of keys consistent with a selected function, wherein said function keyboard is exposed for operative use in said open position;
  wherein said first and second panels are in overlapping alignment with one another in the closed position, and wherein said first and second panels are in non-overlapping alignment with one another and are located on opposite sides of said screen in said open position wherein an additional portion of the upper face of said main body element located beneath and substantially covered by said second panel in said closed position is revealed and accessible to the user in said open position, and
  said screen further being constructed in said additional portion and said at least first portion of said upper face and defining a full screen wherein said first and second panels are in overlapping alignment with one another and the portion of said screen constructed in said additional portion of said upper face whereby the visible area for display of information is restricted to less than the full screen area and wherein said full screen area is available for visible display of information to the user in said open position.

26. A function keyboard for use in an electronic device, said device having a main body element, and a screen for displaying information to the user, said keyboard as defined in claim 25, wherein rotational movement of said first panel about its pivotal axis causes sideways linear movement of said second panel.

27. A function keyboard for use in an electronic device, said device having a main body element, and a screen for displaying information to the user, said keyboard as defined in claim 25, wherein said second panel is inhibited for sideways movement whereby said first panel rotates about its pivotal axis between said open and closed positions.

28. A function keyboard for use in an electronic device, said device having a main body element, and a screen for displaying information to the user, said keyboard as defined in claim 25, wherein said device is a mobile communication device and further comprises a communication keypad constructed on said first face of said first panel, said keypad being exposed for operative use in said closed position.

29. A function keyboard for use in an electronic device, said device having a main body element, and a screen for displaying information to the user, said keyboard as defined in claim 28, further including a control unit, said control unit further operating to rotate the orientation of the display on said screen consistent with the functional position of said first and second panels so that said display is aligned with said communication keypad in said closed position and aligned with said functional keyboard in said open position.

30. A function keyboard for use in an electronic device, said device having a main body element, and a screen for displaying information to the user, said keyboard as defined in claim 29, wherein said orientation is controlled by the position of said first panel.

31. A function keyboard for use in an electronic device, said device having a main body element, and a screen for displaying information to the user, said keyboard as defined in claim 29, wherein said orientation is controlled by the position of said second panel.

32. A function keyboard for use in an electronic device, said device having a main body element, and a screen for displaying information to the user, said keyboard as defined in claim 28, wherein said display on said screen is rotated 90° between said open and closed positions.

33. A function keyboard for use in an electronic device, said device having a main body element, and a screen for displaying information to the user, said keyboard as defined in claim 28, wherein said communication device keypad is locked in an inoperative mode in said open position.

34. A function keyboard for use in an electronic device, said device having a main body element, and a screen for displaying information to the user, said keyboard comprising:
  a first panel mounted on the main body element having upper and lower surfaces for pivotal motion thereon between open and closed positions, said first panel having first and second faces;
  a second panel mounted on the main body element for sideways rectilinear motion thereon and relative thereto between open and closed positions, said second panel having a third face, said third face accessible to the user in said open position and inaccessible to the user in said closed position;
  wherein said function keyboard is constructed in two portions, a first portion constructed in the second face of said first panel and a second portion constructed in said third face of said second panel, each of said function keyboard portions having an array of keys consistent with a selected function, wherein said function keyboard is exposed for operative use in said open position;

wherein said device is a mobile communication device and further comprises a communication keypad constructed on said first face of said first panel, said keypad being exposed for operative use in said closed position;

further wherein said mobile communications device comprises a control unit, said control unit further operating to rotate the orientation of the display on said screen consistent with the functional position of said first and second panels so that said display is aligned with said communication keypad in said closed position and aligned with said functional keyboard in said open position, and wherein sideways linear movement of said second panel causes rotational movement of said first panel about its pivotal axis.

35. A function keyboard for use in an electronic device, said device having a main body element, and a screen for displaying information to the user, said keyboard as defined in claim 34, wherein rotational movement of said first panel about its pivotal axis causes sideways linear movement of said second panel.

36. A function keyboard for use in an electronic device, said device having a main body element, and a screen for displaying information to the user, said keyboard as defined in claim 34, wherein said orientation is controlled by the position of said first panel.

37. A function keyboard for use in an electronic device, said device having a main body element, and a screen for displaying information to the user, said keyboard as defined in claim 34, wherein said orientation is controlled by the position of said second panel.

38. A function keyboard for use in an electronic device, said device having a main body element, and a screen for displaying information to the user, said keyboard comprising:
- a first panel mounted on the main body element having upper and lower surfaces for pivotal motion thereon between open and closed positions, said first panel having first and second faces;
- a second panel mounted on the main body element for sideways rectilinear motion thereon and relative thereto between open and closed positions, said second panel having a third face, said third face accessible to the user in said open position and inaccessible to the user in said closed position;
- wherein said function keyboard is constructed in two portions, a first portion constructed in the second face of said first panel and a second portion constructed in said third face of said second panel, each of said function keyboard portions having an array of keys consistent with a selected function, wherein said function keyboard is exposed for operative use in said open position;
- wherein said first and second panels are in overlapping alignment with one another in the closed position, and wherein said first and second panels are in non-overlapping alignment with one another and are located on opposite sides of said screen in said open position wherein an additional portion of the upper face of said main body element located beneath and substantially covered by said second panel in said closed position is revealed and accessible to the user in said open position;
- wherein said device is a mobile communication device and further comprises a communication keypad constructed on said first face of said first panel, said keypad being exposed for operative use in said closed position, and
- a control unit, said control unit further operating to rotate the orientation of the display on said screen consistent with the functional position of said first and second panels so that said display is aligned with said communication keypad in said closed position and aligned with said functional keyboard in said open position.

39. A function keyboard for use in an electronic device, said device having a main body element, and a screen for displaying information to the user, said keyboard comprising:
- a first panel mounted on the main body element having upper and lower surfaces for pivotal motion thereon between open and closed positions, said first panel having first and second faces;
- a second panel mounted on the main body element for sideways rectilinear motion thereon and relative thereto between open and closed positions, said second panel having a third face, said third face accessible to the user in said open position and inaccessible to the user in said closed position;
- wherein said function keyboard is constructed in two portions, a first portion constructed in the second face of said first panel and a second portion constructed in said third face of said second panel, each of said function keyboard portions having an array of keys consistent with a selected function, wherein said function keyboard is exposed for operative use in said open position;
- wherein said first and second panels are in overlapping alignment with one another in the closed position, and wherein said first and second panels are in non-overlapping alignment with one another and are located on opposite sides of said screen in said open position wherein an additional portion of the upper face of said main body element located beneath and substantially covered by said second panel in said closed position is revealed and accessible to the user in said open position;
- wherein said device is a mobile communication device and further comprises a communication keypad constructed on said first face of said first panel, said keypad being exposed for operative use in said closed position, and
- wherein said display on said screen is rotated 90° between said open and closed positions.

40. A function keyboard for use in an electronic device, said device having a main body element, and a screen for displaying information to the user, said keyboard comprising:
- a first panel mounted on the main body element having upper and lower surfaces for pivotal motion thereon between open and closed positions, said first panel having first and second faces;
- a second panel mounted on the main body element for sideways rectilinear motion thereon and relative thereto between open and closed positions, said second panel having a third face, said third face accessible to the user in said open position and inaccessible to the user in said closed position;
- wherein said function keyboard is constructed in two portions, a first portion constructed in the second face of said first panel and a second portion constructed in said third face of said second panel, each of said function keyboard portions having an array of keys consistent with a selected function, wherein said function keyboard is exposed for operative use in said open position;

wherein said first and second panels are in overlapping alignment with one another in the closed position, and wherein said first and second panels are in non-overlapping alignment with one another and are located on opposite sides of said screen in said open position wherein an additional portion of the upper face of said main body element located beneath and substantially covered by said second panel in said closed position is revealed and accessible to the user in said open position;

wherein said device is a mobile communication device and further comprises a communication keypad constructed on said first face of said first panel, said keypad being exposed for operative use in said closed position, and wherein said communication device keypad is locked in an inoperative mode in said open position.

* * * * *